Nov. 23, 1965   D. G. EKSTEN ETAL   3,219,936
AUTOMATIC CONTROL CIRCUIT UTILIZING INPUT AND
INTERNAL SIGNALS CONTROLLING RESET FOR
PROVIDING IMPROVED STEP RESPONSE
Filed May 26, 1961   3 Sheets-Sheet 1

INVENTORS
*Dennis G. Eksten*
BY *Gunnar F. Ohlson*

ATTORNEYS

Nov. 23, 1965    D. G. EKSTEN ETAL    3,219,936
AUTOMATIC CONTROL CIRCUIT UTILIZING INPUT AND
INTERNAL SIGNALS CONTROLLING RESET FOR
PROVIDING IMPROVED STEP RESPONSE
Filed May 26, 1961    3 Sheets-Sheet 3

INVENTORS
Dennis G. Eksten
Gunnar F. Ohlson

BY

ATTORNEYS

United States Patent Office

3,219,936
Patented Nov. 23, 1965

3,219,936
AUTOMATIC CONTROL CIRCUIT UTILIZING INPUT AND INTERNAL SIGNALS CONTROLLING RESET FOR PROVIDING IMPROVED STEP RESPONSE
Dennis G. Eksten, Loves Park, and Gunnar F. Ohlson, Rockford, Ill., assignors to Barber-Colman Company, Rockford, Ill., a corporation of Illinois
Filed May 26, 1961, Ser. No. 112,910
18 Claims. (Cl. 328—69)

The present invention relates to means for controlling a condition and more particularly to a control arrangement capable of accurate control in the face of large step changes of the set point or changes in the condition from the set point.

In the automatic control of a condition by a control circuit having proportional action plus integral (i.e., reset) action, and either with or without derivative action, parameters are chosen to produce optimum control characteristics in the vicinity of the set point. However, such a system will usually not operate satisfactorily in the face of large step changes of the set point or changes in the condition from the set point, typically overshooting the set point to a degree depending upon the amount of the change which has been made. The problem of overshoot is encountered, for example, in a batch heating process where a batch must be brought up to a set temperature promptly from the ambient condition. Overshooting may be highly undesirable since the material in the batch may be subject to unwanted chemical changes upon exceeding a critical temperature. Consequently it is a common practice to bring a batch up to temperature under manual control and with care and judgment being exercised by the operator to avoid overshoot, restoring the system to automatic control after the desired condition has been reached.

The difficulties of automatic start-up have been rather fully discussed in the literature. See, for example, chapter 19 of Frequency Response for Process Control by Caldwell, Coon, and Zoss, McGraw-Hill Book Company, Inc., New York, 1959, entitled, "The Start-Up Problem." The reason for serious overshoot in systems employing integral, i.e., reset action during start-up, is that the integral function, being a time integral of the input error, produces an integral signal whose contribution becomes so large as to exceed the normal maximum signal in the controller amplifier, thus negating possible proportional (and rate) corrective action. The result is that the system calls for full output until the controlled variable reaches set point at which time the input error changes polarity. The amplifier does not become responsive and, hence, again pass normal proportional and derivative action signals until the integral of the input error signal, as a result of the overshoot, reduces substantially to a compartively low value. Usually the overshoot is followed by an undershoot so that cycling takes place until stability at the set point is finally achieved. The term "reset windup" has been applied to this condition.

The problem is not solved by simply reducing the sensitivity, limiting maximum output, or by reducing the amount of integral action since each of these tends to degrade the control characteristics under normal "on line" conditions. Use of derivative action ameliorates the problem somewhat where a "rate-before-reset" or cascade connection is made, i.e., where the output of the derivative stage is fed to the integral or reset stage, so that the controller may begin to recover prior to the time that the condition actually reaches the set point.

However, since the use of a cascade type controller constitutes an inadequate solution at best, efforts have been recently made to intentionally disable the resent function automatically during start-up as a function of the input error signal. The following articles describe recent attempts to disable the reset function upon making large step changes in the set point as occur during start-up: "Better Start-Ups for Batch Processes," by R. L. Farrenkopf, I.S.A. Journal, volume 7, No. 7 (1960): "Solving Advanced Control Problems With Electronics," by P. H. Drinker, I.S.A. Journal, volume 7, No. 8 (1960); and "Electronic Flow Control," by J. G. Ziegler et al., Taylor Technology, volume 10, No. 4 (1959). However, it is found that all the suggestions made to date have their limitations or shortcomings such as the necessity for abrupt switching action which generally affects the stability of the system, the necessity for additional adjustment to accommodate a particular process, insufficient reset gain, the inability to achieve output extremities for a proportionad band larger than the transmitting slide wire input error span, and the inability to operate equally well for a large step decrease as well as a step increase in the set point. The latter is of importance where it is necessary to bring a batch up to a certain high temperature followed by a substantial reduction to a lower or "hold" temperature either with or without further programmed steps.

Accordingly it is an object to provide a control system which has optimum control characteristics under normal "on line" conditions and which is, nevertheless, capable of responding to a large change in the set point, such as encountered when starting up a batch process, without overshoot, within a minimum period of time, and under fully automatic control. Furthermore, it is an object to provide a control system which has optimum control characteristics under normal "on line" conditions and which is capable of responding to a small change in set point which persists for a long duration without overshoot within a minimum period of time under fully automatic control.

It is another object of the present invention to provide an automatic controller which is particularly well suited to a batch process and which does not require manual supervision during start-up nor the making of any adjustments, based upon prior experience, to accommodate the controller to the particular function being performed. It is a more specific object to provide a control arrangement which adapts itself to processes having widely different time constants and which is not restricted to operation within a particular range of time constant.

It is a further object of the invention to provide an automatic control arrangement which is characterized by continuous or progressive action as the control point is approached thereby enhancing the stability of the system and which avoids the abrupt switching used in some prior systems which may shock the system into a condition of oscillation or hunting.

More specifically it is an object of the invention to provide an automatic control system which avoids the problem of "reset windup" experienced with conventional control systems and which has novel provisions for "inhibiting" the reset function when certain criteria are met. By this it is meant that the reset is to be controlled in such a manner so as to still permit normal proportional (and derivative) corrective action to occur; it is not meant that reset is to be completely disabled or rendered totally ineffective. It is also a further definition of "inhibited" reset and a related object of this invention that the "inhibited" reset action will permit resetting to controller output extremities even if the proportional band setting is larger than the input error transmitting slidewire span. This "inhibited" reset action will hereinafter be referred to simply as inhibited reset. It is a further object to provide an automatic control system in which the reset function is inhibited progressively in accordance with the input error signal but at a threshold of input error signal which varies and which depends upon the controller internal error, which may also be thought of as the "degree of saturation." The controller internal error signal is defined as being the difference between the input error signal and the controller feedback signal. It is proportional to the amplifier signal level. It is a related object of the invention to provide an automatic control system in which the reset function is progressively inhibited or uninhibited in joint response to input error and internal error without any abrupt transition which might give rise to instability or hunting. In one of the aspects of the invention it is an object to provide an automatic control circuit having means for producing an anti-reset signal which varies in a predetermined way in accordance with a joint function of the input error signal and the controller internal error and which signal is capable of inhibiting the reset function signal which is built up in the system directly as the time integral of the input error. This build up can result from a large step change over a relatively short interval or a small change over a long interval of time. More specifically it is an object to produce, in the described system, a progressively developed anti-reset signal for the purpose of inhibiting the reset signal voltage when certain conditions are met.

It is a related object of the present invention to provide an automatic controller having provision for eliminating the condition of reset windup upon satisfying of certain conditions which is free of any redundancy, i.e., any tendency to inhibit the reset function when such function should not, in fact, be restricted, as may for example, occur in conventional systems where input error is used as the criterion for disablement, and where a large input error may exist in the transient state without the system being wound up. Also, where input error alone is used, it is not usually possible to achieve controller output limits whenever the proportional band is larger than the transmitting slide wire error span. It is a still further object of the present invention to provide means for inhibiting the reset function under certain conditions to avoid reset windup but which nevertheless does not affect the ordinary operation of the circuit so that the normal reset function is available under the "on line" conditions.

It is still another object of the invention to provide a control system which is capable of handling large step increases in the set point, as on start-up, and large step decreases as required, for example, where the temperature of a batch is to be quickly raised to a first value and subsequently reduced and maintained at a second, lower value.

It is a general object to provide an automatic control device which is more reliable than the electromechanical systems of conventional type and in which the various control functions may be accomplished electronically so that a high degree of compactness, in addition to reliability, may be attained.

Other objects and advantages of the invention will become apparent upon reading the attached detailed description and upon reference to the drawings in which.

While the above invention has been described in connection with certain preferred embodiments, it will be understood by one skilled in the art that the invention is not limited thereto and that it is intended to cover various other equivalent and alternative arrangements falling within the spirit and scope of the appended claims.

Figure 1:
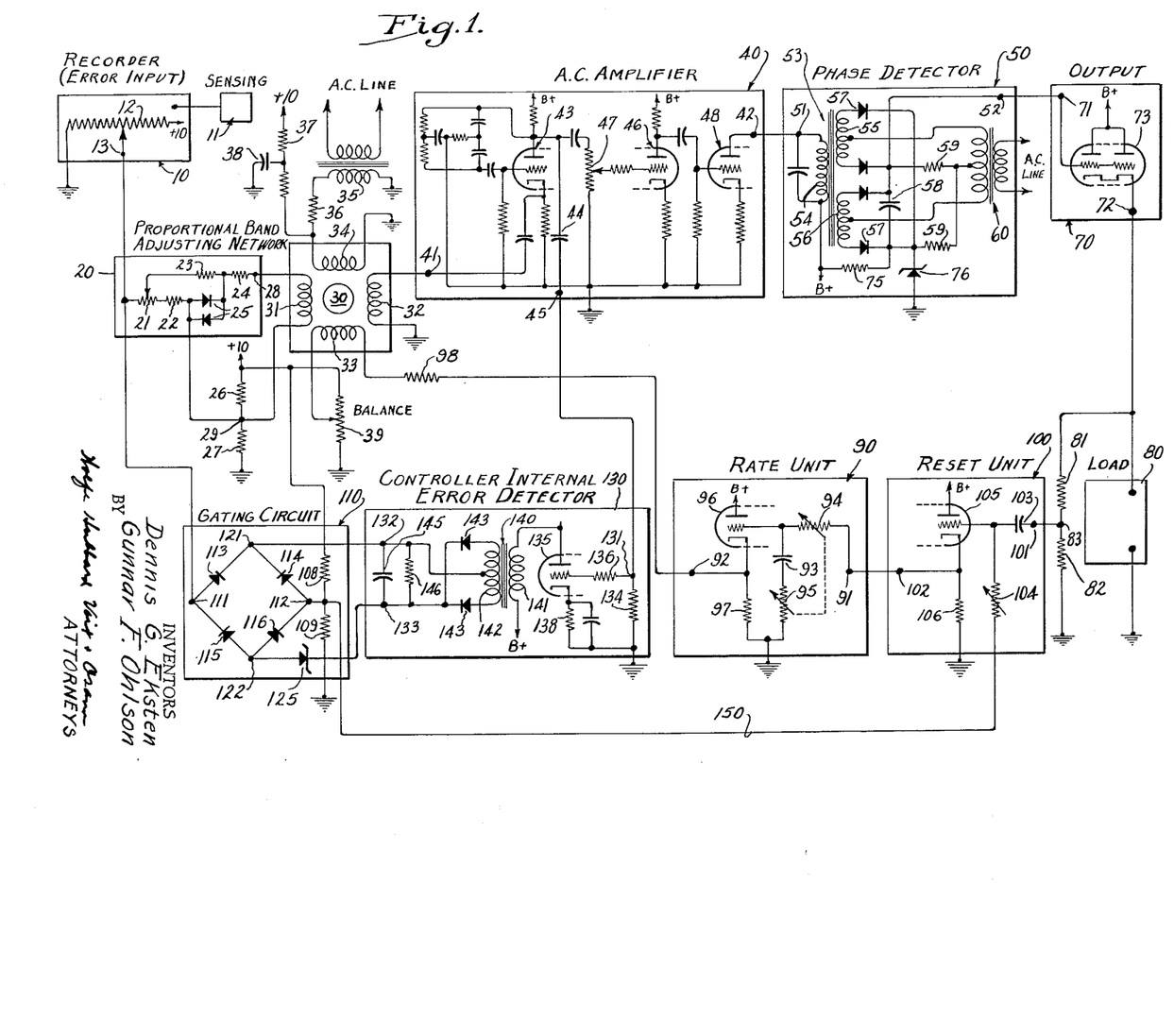
FIGURE 1 is a schematic circuit diagram of a control system embodying the present invention with functional subassemblies outlined for identification.

Turning now to FIG. 1 there is shown a schematic diagram of an automatic controller constructed in accordance with the present invention. In its input circuit, the device has a recorder 10 for recording the controlled condition, the condition being sensed by a sensing device 11. The recorder is of conventional manufacture including an input transmitting slide wire 12 and having a output terminal 13. Means (not shown) are included within the recorder for adjusting the set point so that when the condition is at the set point a voltage of five volts exists at the output terminal 13. Variations above and below the set point are effective to produce changes in controller input voltage within the range of say, plus 10 volts to 0 volts. Any other sensing device capable of producing 0 to 10 volts output may be substituted for the recorder. While the device to be described is capable of controlling any condition, it may be assumed, in order to facilitate understanding, that the condition to be controlled is that of temperature, that the sensing element 11 is capable of detecting changes in temperature, and that means are provided at the output of the control circuit for changing the amount of heat, as the "manipulated variable," which is admitted to the vessel or other space being controlled.

For the purpose of adjusting the proportional band, a proportional band adjusting network 20 is provided having a potentiometer 21, resistors 22, 23, 24 and diodes 25. The return connection from the proportional band adjusting network is made to the center of a voltage divider consisting of resistors 26, 27 so that a net output voltage for application to the remainder of the control circuit appears at output terminals 28, 29.

For the purpose of converting the direct voltage signal at terminals 28, 29 to an A.-C. signal having proportional magnitude and of a phasing which depends upon the polarity of the D.-C. signal, a magnetic modulator 30 is provided. The latter includes an input coil 31 and an output coil 32, a negative feedback winding 33, and a biasing winding 34. The biasing winding is supplied with A.-C. excitation and D.-C. bias. The A.-C. excitation is obtained from a transformer winding 35 coupled to the A.-C. supply line, a resistor 36 being provided in series therewith. The D.-C. bias is obtained from the ten volt D.-C. supply via a resistor 37 having a bypass capacitor 38.

The function of the feedback winding 33 will be made clear as the discussion proceeds. It will suffice to say that a direct voltage is applied thereto from a feedback loop which is coupled to the output of the control circuit. The end of the winding 33 is connected to the slider of a balancing potentiometer 39 in order to correct for minor unbalance inherent in the modulator and other manufactured components. For physical details of the magnetic modulator, reference is made to the literature.

To amplify the A.-C. output of the magnetic modulator, an A.-C. amplifier 40 is provided having an input terminal 41 and an output terminal 42. The first stage of the amplifier comprises a triode 43 having a grounded grid connection and with the signal being injected in the cathode circuit. Coupled to the plate terminal of the input tube 43 by a capacitor 44 is an auxiliary output connection 45. It will suffice for the present to say that the signal at the auxiliary output terminal is employed as a measure of the signal level of the amplifier 40, which is proportional to controller internal error, and the manner in which such signal is utilized in practicing the invention will be covered at a later point. The output of the first triode 43 is coupled to a second triode 46 via a gain control 47. Finally the output of the second stage is fed to a third triode 48 which is connected to the amplifier output terminal 42. Further details of the amplifier 40 will be apparent to those skilled in the art, the purpose of the amplifier being basically to provide an A.-C. output signal which is an amplified version of the input signal and avoiding the problems inherent in the use of a D.-C. amplifier.

In order to convert the A.-C. output from the amplifier back to a D.-C. signal of corresponding amplitude and of a polarity which depends upon the phase, a phase detector 50 is used having an input terminal 51 and an output terminal 52. Included within the phase detector is a transformer 53 having an input winding 54 and balanced output windings 55, 56. Each of the windings 55, 56 is center tapped and provided with rectifying diodes 57, the rectified outputs being fed into a common output circuit consisting of a capacitor 58 and load resistors 59. For reference purposes a transformer 60, coupled to the A.-C. line, is used having balanced secondary windings which are connected respectively to the center taps of the windings 55, 56 of the transformer.

The operation of phase detectors of the type described above is well known to those skilled in the art and the operation need not be described in detail. Suffice it to say that no voltage will be produced at the output terminals when the reference transformer 60 is energized and in the absence of an input signal. However, when a signal is received at the input terminal 51 the detector is unbalanced in one direction or the other depending upon the phase of the input signal relative to the voltage at the reference transformer. This produces a direct voltage, either positive or negative, at the output terminal 52, the magnitude depending upon the magnitude of the A.-C. input at terminal 51.

For the purpose of providing current amplification, a D.-C. power output stage 70 is provided having an input terminal 71 and an output terminal 72 and utilizing a triode 73, with the input terminal being connected directly to the grid of the triode. Effectively in series with the input of the triode is a source of constant voltage for setting the mid-scale or 50% output voltage of the controller output triode. This constant voltage source is made up of a resistor 75 connected to B+ together with a zener diode 76. It will be noted that the output tube 73 is connected as a cathode follower with the cathode feeding a load device 80. The load device 80 may be any suitable device which is effective to control the manipulated variable in accordance with the magnitude of the signal fed to it. In a typical temperature controlling arrangement for a batch process, the output device 80 may be in the form of an adjustable steam valve having servo means for admitting heat to the controlled space in proportion to the received output signal.

In order to provide a feedback loop around the amplifier, the output terminal 72 of the output tube 73 is provided with a voltage divider consisting of series connected resistors 81, 82 having a feedback output terminal 83. This terminal is coupled, by means to be discussed, to the feedback winding 33 in the magnetic modulator, with the connection having the purpose of employing negative feedback to obtain the desired controller modes which will be explained subsequently. It may be noted here, however, that the magnetic modulator 30 may be considered with or as a part of the amplifier 40, and that the composite amplifier has two inputs with means to combine or algebraically sum the respective input signals applied thereto. In other words, the input error signal applied to winding 31 is distinctly a deviation error representation, whereas the internal error signal at terminal 41, or as amplified at terminal 45, represents the algebraic combination of the input error signal on winding 31 and the feedback signal on winding 33. As pointed out below, the feedback signal includes as one component thereof a reset signal.

For the purpose of producing derivative action, commonly referred to as rate correction, a rate unit 90 is interposed in the amplifier feedback loop having an input terminal 91 and an output terminal 92. The rate unit includes a network which comprises a capacitor 93 and resistors 94, 95, with the latter being variable and preferably ganged together in order to permit the usual adjustment of rate action. The output of the network is fed to the grid of a coupling tube 96 which is connected as a cathode follower and which has a cathode resistor 97. A resistor 98 is in series with the output. The effect of the rate unit 90 in the feedback loop is well understood by those skilled in the art and consequently it will suffice to say that it introduces corrective action resulting from abrupt changes in the controlled variable which may occur, for example, upon sudden changes in loading. Thus in a typical case any sudden drop in the controlled temperature has the effect of delaying the feedback signal in the feedback loop thereby temporarily permitting a larger error or actuation signal in the amplifier which causes the output device 80 to respond to a greater extent than it would by proportional action alone thereby tending to bring the controlled condition more promptly back to the set point.

In carrying out the present invention means are provided in the feedback loop for producing integral or reset action. Thus a reset unit 100 is used having an input terminal 101 and an output terminal 102. The reset network includes a capacitor 103 and a reset resistor 104 which is adjustable. The output of the network feeds into the input of a coupling tube 105 which is connected as a cathode follower having a cathode resistor 106.

For the purpose of establishing the nominal reference voltage of the reset unit 100 in the feedback loop, the reset resistor 104, which feeds the grid of the tube 105, is connected to a source of reference voltage. In the present instance this source of reference voltage is the central terminal of a voltage divider consisting of resistors 108, 109. With the ungrounded end of the voltage divider connected to a plus 10 volt D.-C. source, it will be apparent that the reference voltage at the center and which is applied to the grid of the tube 105 via the resistor 104 is plus 5 volts. This establishes a central operating point on the tube characteristic curve and consequently determines the voltage which exists at the output terminal 102 under steady state conditions. Normal fluctuations in the feedback signal at terminal 83 of the voltage divider, and which are fed to the input terminal 101, serve to swing the grid voltage above and below the nominal value of 5 volts to produce corresponding time dependent changes in voltage at the output terminal 102.

It will be understood that when the control system is operating under "on line" conditions in the vicinity of the control point the incremental contribution of reset will be small as well as alternating in sign since the error is small and alternating in polarity. The reset capacitor 103 and resistance 104 in the reset unit form a voltage divider whose output is time dependent. In terms of the circuit, the voltage at the output of the capacitor 103, and which is applied to the grid of the tube 105, will tend to follow rather closely a rapidly changing voltage at the input terminal 101. However, with a more slowly varying voltage at the input terminal 101, the feedback signal passed through the reset device is altered so that a reduction in negative feedback results in larger overall controller gain. The composite effect is that the controller gain increases with decreasing error frequency so that in the steady state, any value of output that the process may require can be obtained with essentially zero error.

Prior to discussing the action of the reset unit in the face of prolonged changes in the condition as, for example, may occur when a large step change is made in the set point, it is necessary to establish the nominal center point of the range of control. This is the point within the range of the controller where the set point corresponds to the control point and where there is no droop. In a typical system this point may correspond to, say, a fifty percent output condition since, being midway between zero percent output and one hundred percent output, it is the average value. Consequently in the present system it is desired that the resistors 81, 82 in the voltage divider be so adjusted that under the condition of fifty percent output a voltage exists at the terminal 83 thereon which corresponds to the referenve voltage which is applied to the reset unit, namely, five volts.

Thus, it will be apparent that if a large slide wire error exists so that the output of the control circuit persists above the fifty percent output condition for an extended period of time, the voltage at the input terminal 101 of the reset unit will persist at a value above five volts. This causes the reset capacitor 103 to acquire a charge thereby producing a voltage drop across the capacitor, and it is this voltage drop which in essence constitutes the reset signal. While the operation of the overall circuit, including the features of the present invention, will be covered in detail at a later point, the operation of the reset unit per se may nevertheless be made clear at this point by a simple example. Let it be assumed that a large step change of set point is made in the upward direction with the result that substantially full output is provided at the output of the controller and so that the voltage at terminal 83 of the voltage divider substantially exceeds the normal voltage of five volts. The resulting difference in voltage across the terminals of the capacitor 103 persisting over an extended period causes the capacitor to charge up to a value which is equal to the differential between the voltage at the input terminal and the reference voltage of five volts. Because of the voltage drop across the capacitor 103, the grid voltage is thus returned to the five volt level and the voltage at the output terminal 102 of the reset unit becomes the same as that which normally exists at the fifty percent output condition. Stated in other words, the feedback signal becomes considerably less than that which would normally be applied to the feedback winding 33 of the magnetic modulator under a high load condition. This reduction in feedback signal produces a net output signal from the magnetic modulator which is higher than the value which would normally result from the high load condition. Such reduction in the feedback signal has the effect of shifting the control point upwardly. The effect of such shift is to compensate for droop, causing the control point to more nearly match the set point.

Conversely where a large step change is made in the downward direction just the opposite occurs. The load is lightened causing a drop in the voltage at point 83 to below five volts. This causes the capacitor 103 to be charged with opposite polarity so that the voltage which appears at the output 102 of the reset unit becomes greater than the value which would normally be obtained, thereby increasing the amount of feedback and tending to lower the control point. Again the effect is to compensate for droop and to bring the control point into closer accordance with the set point.

Unfortunately, where unusually high or unusually low loading conditions persist over a long period of time the reset signal, i.e., the voltage existing across the reset capacitor 103, becomes sufficiently high as to prevent proportional and derivative corrective action to take place until the vicinity of the control point is reached. As has been pointed out earlier in the discussion, the reset signal may reach such a high level as to permit an abnormally large signal level in the amplifier which represents the condition of reset windup which persists as long as the internal error signal fed into the amplifier continues to be of the same phase, i.e., as long as the condition is below the set point, and with inevitable overshoot beyond the set point.

In accordance with the present invention means are provided for effectively inhibiting integral or reset action in accordance with an anti-reset control function which depends upon the magnitude of the input error or offset and which is only applied as the controller approaches an abnormally high internal error, i.e., as the condition of saturation is approached. More specifically, means are provided for generating an anti-reset signal for inhibiting integral control action which is progressively effective in accordance with the amount of input error and which comes into effect at a threshold which varies in accordance with the magnitude of the controller internal error.

In the present instance the anti-reset voltage is achieved by providing a gating circuit responsive to the value of the input error, with the gate being under the control of the amplifier signal so that the gate is progressively opened at high values of controller internal error. In the preferred form of the invention the gate is in the form of a diode bridge having input and output terminals with a zener diode, in series with a source of the amplifier signal, connected across the diagonal terminals of the bridge. Thus the gate indicated at 110 has input and output terminals 111, 112, and is made up of diodes 113–116. Connected in series with the diagonal terminals 121, 122 of the bridge, which function as a second set of input terminals, is a zener diode 125, and applied to the bridge and diode is a source of controller internal error voltage 130. The latter has an input terminal 131, and output terminals 132, 133.

For the purpose of producing a signal which is proportional to the signal passing through the amplifier, and hence to the controller internal error, the input terminal of the device 130 is coupled to the first stage of amplification of the amplifier 40, via the terminal 45 on the latter, and with the circuit being completed to ground through a resistor 134. Means are provided for both amplifying and rectifying the signal tapped from the amplifier to produce a direct voltage output at the terminals 132, 133 which is proportional to the signal passing through the amplifier. To accomplish this, an amplifier tube 135 is provided having an input limiting resistor 136 and a cathode resistor 138. The output of the tube 135 is connected to a transformer 140 having a primary winding 141 and a center tapped secondary winding 142. Full wave rectification is provided by diodes 143 connected to halves of the secondary winding, the rectified output voltage being filtered by a capacitor 145 shunted by a bleeder resistor 146. To complete the circuit the output terminal 112 of the gate is connected in parallel with the source of reference voltage for the reset unit, i.e., to the terminal between the resistors 108, 109 of the voltage divider. Since the resistance of the resistors 108, 109 is relatively high, the effect of the parallel connection when the gate is open is to change the value of the reference voltage supplied to the reset unit, via the line 150, above and below the five volt level for inhibiting the reset action.

In carrying out the present invention the zener diode 125 may be of the type commercially available as 1N470 and chosen to have a zener voltage of approximately seven volts. The controller internal error detector 130 is so constructed as to be capable of reaching such zener voltage when the amplifier signal level rises to a value which is above the normal maximum signal level. The diodes 113–116 may be of the type commercially available as 1N1763.

In analyzing the gating circuit it is helpful to chart the anti-reset voltage produced at the output terminal of the gate as a function both of the input slide wire error voltage to input terminal 111 and the internal controller error voltage existing at output terminals 132, 133 of the internal error detector 130. For the sake of simplicity and ready understanding, it will be assumed that the forward drop through the bridge diodes is zero. The voltage from the controller internal error detector is so polarized with respect to the zener diode 125 that it tends to break down the zener. In computing the particular values of anti-reset voltage it is helpful at the outset to recognize two separate conditions: the first condition where the input voltage from the slide wire 12 is greater than the reference voltage of five volts existing at the output terminal 112 which produces current flow through the diodes 113, 116 in the bridge circuit and the second condition where the voltage from the slide wire is less than the five volt reference voltage which will tend to produce current flow through diodes 114, 115 of the bridge circuit. However, these are initial conditions only and, provided that the total voltage applied to the zener is sufficient to break down the zener, the voltage at the output of the gating circuit will necessarily depart from the five volt reference value.

By way of example let it be assumed that the input voltage from the slide wire is seven volts and that the voltage at the output of the internal error detector is six volts. Since the slide-wire voltage is higher than the reference voltage it is apparent that current will tend to flow through the diodes 113, 116 with a net voltage difference across the horizontal terminals of the bridge of seven minus five or two volts. This voltage difference, which is effectively in series with the voltage from the internal error detector (six volts) produces a total voltage of eight volts which is sufficient to initiate current flow through the zener diode. Once current exists through the zener diode, establishing a fixed voltage drop of seven volts thereacross, additional current flow takes place through the resistor 109 of the voltage divider, causing the voltage at the terminal 112 to swing above the five volt reference value. Thus there will be a voltage increase in the line 150. The actual value of the augmented voltage may be readily ascertained by adding the slide-wire voltage (seven volts) to the internal error detector voltage (six volts) giving a total of thirteen volts. Because of the seven volt drop through the zener diode, the voltage at the output terminal 112 is the difference, or six volts. Because the resistors 108, 109 are of relatively high resistance, the gate voltage is the one that controls the voltage in the line 150. What happens in resistor 109 is that six volts rather than five, applied to the central terminal simply causes additional current flow so that the IR drop across it becomes six volts rather than five volts.

If the input error voltage (plus the five volts by which it is off ground) had been, say, six volts instead of seven, with the internal error voltage remaining at six, then the output voltage existing in the line 150 would have remained at the reference value of "5." Moreover, if the slide-wire voltage with respect to ground had been five volts, the net voltage difference of zero when added to the internal error voltage of six volts would be less than that required to break down the zener. No current could, under such circumstances, flow through the bridge so that the voltage would be determined by the voltage divider 108, 109, i.e., the voltage in the line 150 would remain at five volts. The same condition would hold true for an input error voltage with respect to ground of four volts. Thus "5" has been entered in the chart of FIG. 2 for the values of input error with respect to ground potential of "6," "5," and "4."

However, upon still further reducing the input error voltage to three volts, the voltage difference across the bridge, added to the internal error voltage, when applied to diodes 114, 115 would again be sufficient to break down the zener resulting in current flow through the bridge causing the output voltage to depart from its reference value.

The actual value is, as above, easily ascertained. The input error voltage with respect to ground of three volts compared to the reference voltage of five volts gives a difference, across the bridge, of two volts. When this is added to the internal error detector voltage of six volts the total becomes eight volts which is sufficient to break down the zener. However once the zener is broken down, the voltage across it cannot exceed seven volts. To meet this condition, the voltage difference across the bridge must be one volt, which in turn requires that the voltage at the output of the voltage divider, which is applied to the line 150, swings to four volts. This accommodation is brought about by increased current, and increased IR drop, in the resistor 108. The value of "4" is accordingly filled in the chart of FIG. 2 at the six-three coordinate position of controller internal error and input error.

A similar analysis may be made for still lower values of input error enabling the entry of "3" "2" and "1" in the six volt internal error column. Moreover, the analysis may be repeated for other values of internal error detector voltages to complete FIG. 2. It is to be noted that wherever the net voltage applied to the zener is not sufficient for conduction, the output voltage in the line 150 returns to the reference value of five volts.

Figures 2, 3, 3A:
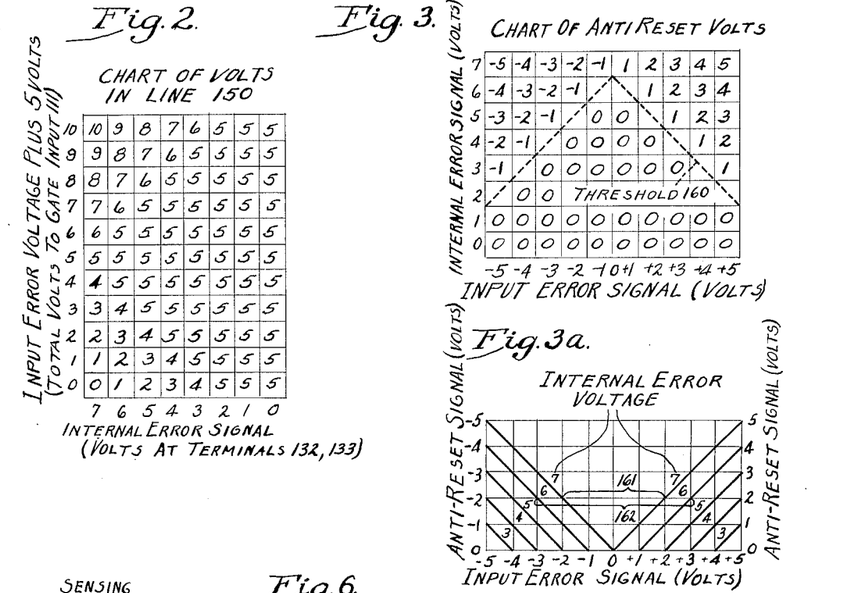
FIG. 2 is a chart of voltage at the output of the gate for various combinations of controller internal error signal and input error signal plus a constant.
FIG. 3 is a chart similar to FIG. 2 but in terms of net anti-reset voltage and net input error.
FIG. 3a sets forth the information of FIG. 3 in graphic form.

Although voltages have been charted in FIG. 2 in terms of "total volts" at the input and also "total volts" in line 150, it will be understood that when the system is in equilibrium at the control point, a reference voltage of five volts exists at both of these points.

For the purpose of isolating the anti-reset component of voltage in the line 150 it is desirable to rechart the voltages, subtracting five from the input error voltage and reset line voltage. This has been accomplished in FIG. 3 where it will be noted that the threshold characteristic, indicated at 160, is of inverted V shape. It is apparent from this figure that no anti-reset voltage whatsoever is produced when both the internal error voltage and the input error signal are at a low value. Nor is any anti-reset voltage produced even for high values of input error until amplifier signal level becomes appreciably high. Also it may be noted that no anti-reset voltage is produced at low values of input error until a very high amplifier signal level exists. Finally, it will be noted that when the input error and internal error are both high, a high value (maximum of plus or minus five volts) of anti-reset voltage is produced. In other words, maximum gate output requires both a high input error signal and a high internal error signal. It is to be particularly noted that the anti-reset signal does not vary abruptly with either input error or internal error. On the contrary it varies smoothly and progressively with input error starting at a threshold which is determined by the internal error. For further visualizing the manner in which the anti-reset voltage varies with input error and internal error, reference is made to FIG. 3a which sets forth a family of curves for respective values of internal error. It will be apparent from the figure, for example, that a given anti-reset voltage is produced at lesser input error where the internal error is at an intermediate value.

In understanding the circuit and the anti-reset voltage function, the gating circuit 110 may also be viewed as a "following" device. That is to say, for high values of internal error, the output voltage, i.e., anti-reset voltage tends to be equal or proportional to the input error voltage whereas at low values of internal error the output voltage does not follow the input voltage at all but is independent of it and at a reference value of five volts and with a smooth transition inbetween. For intermediate values of internal error an anti-reset voltage is produced upon an increasing value of input error but with the voltage being effective at a threshold of input error which decreases as internal error is increased and which increases as the internal error is decreased.

It is important to understand that with a given input error, the anti-reset voltage is determined by the auxiliary closed loop formed by means of the internal error detector 130, the gating circuit 110, line 150, the reset unit 100, the rate unit 90, the modulator 30, and the first stage of the amplifier 40. This loop action is of the essence in permitting resetting to output limits (0% and 100%) when inhibiting is taking place. Self-regulation of the loop occurs in the following manner: A decrease in feedback signal at 102 due to building up the capacitor 103 voltage signal causes the internal controller error 41 (amplifier signal level) to increase. This causes the internal error detector output 133 to increase thereby opening the gate 110 further, which will further increase the voltage along line 150 and hence reduce the assumed decrease at 102 and simultaneously regulate the voltage across capacitor 103.

For a proportional band larger than the input error span this same effect permits maximum (or minimum) output because of the following factors: When the proportional band is increased, the modulator 41 output component due to input error only is decreased. This component acts as a bias signal level adjustment on the auxiliary loop action just described. When the proportional band setting 21 is less than the input error span, this component signal is large enough to permit the gate 110 to open fully thus maintaining the capacitor 103 voltage near zero. When the proportional band is larger than the input error span, this component is not large enough to allow full gate action so that the capacitor voltage does not return to zero. The capacitor 103 voltage becomes approximately the difference between the output limit feedback voltage 83 with reset and the output feedback voltage that would have been present with no reset. For every different proportional band larger than the input error span, this difference increases with proportional band. Because of this difference in voltage, it is possible to achieve output limits regardless of the relationship of proportional band to input error span.

In the preferred form of the device, operation of the gating circuit has been described in connection with the zener diode having a zener voltage of seven volts. However, analysis will show that the breakdown voltage of the zener acts to control the threshold of the anti-reset voltage, i.e., the amount of input error at which the anti-reset voltage is initiated assuming that the condition of sufficient internal error is present. Thus increasing the zener voltage, by appropriate choice of zener, to a value above seven volts would tend to increase the threshold, i.e., the value of input error at which the anti-reset voltage begins, while decreasing the zener voltage would tend to lower the threshold.

Experience with the above control arrangement shows that progressive inhibiting of the reset circuitry in accordance with the control function described above brings about a substantial improvement in operation of a control circuit under start-up conditions and with reset windup being substantially eliminated. And the arrangement is, moreover, free of the disadvantages associated with prior attempts to solve this start-up problem.

With the above teachings in mind, the operation of the control system described above will be apparent to one skilled in the art. It will be understood first of all that during normal "on line" conditions, with the system in equilibrium at the control set point, a certain output is produced depending upon the load and the three mode response—proportional, rate, and reset—are present by means of normal action of the feedback loop. Thus the signal at the output of the rate circuit is proportional to the voltage at the input. Similarly the reset circuit responds so that with the normal reference voltage of five volts applied to the reset control line 150, the average voltage appearing at the output of the reset unit is independent of the average voltage at the input 101.

By contrast, in considering the start-up condition and assuming that the system is applied to a batch heating device, the process requires raising the temperature rapidly to a set point where such temperature is to be maintained. For the sake of illustration, it will also be assumed that maintenance of the set point imposes a load requiring fifty percent of the controller output and that the unit 20 is set to produce a proportional band equal to the input error transmitting span. The general shape of the curves applicable to start-up are set forth in FIGS. 4a–4f, the solid curves showing the variation, with time, of the voltages in the present device and the dotted curves being typical of prior art devices having no provision for avoiding reset windup.

Figure 4A:
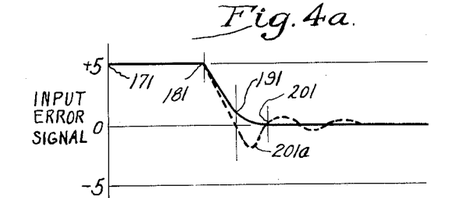
FIGS. 4a–4f are a series of graphs showing respective variations in input error signal, controller output, internal error voltage, anti-reset voltage, net reset signal and controlled condition.
Figure 4B:
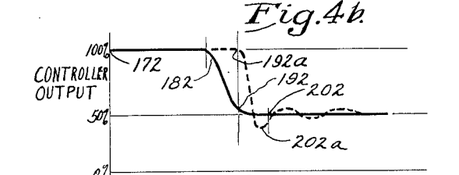
Figure 4C:
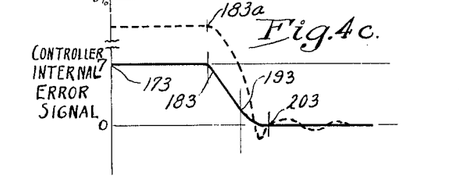
Figure 4D:
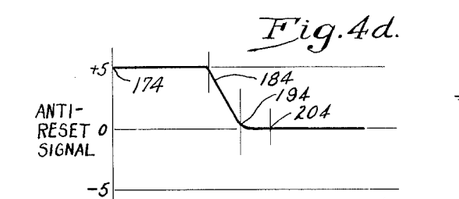
Figure 4E:
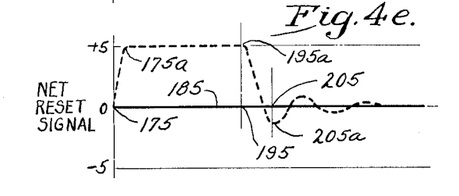

When the system is turned on and the recorded 10 is set for a large increase in set point, the slider on the slide wire 12 is immediately driven to the end of its range producing a maximum output voltage as set forth at 171 in FIG. 4a. This large input error signal acting upon the amplifier causes the amplifier to produce the maximum output of which it is capable as indicated at 172 in FIG. 4b. Under such conditions the internal error is in excess of the normal level such that the voltage as measured at the output of the detector 130 is maximum having a value on the order of seven volts as shown at 173 in FIG. 4c. Because of the high output, the voltage at point 83 of the output voltage divider tends to be maximum.

In the absence of the present invention the relatively high voltage, say on the order of ten volts, applied on the right side of the capacitor 103, compared to the reference voltage of five volts on the other side would tend to charge the capacitor and, upon persistence of the condition, the voltage across the capacitor would rise to the level of five volts. Stated in other words, in the absence of the present invention a reset signal of approximately five volts would be developed in the reset unit 100. Such a high value of reset signal on start-up carries the severe penalty discussed above. It will be seen, however, that in the present device such reset signals is effectively defeated by the anti-reset gating circuit 110. Thus, since the input error signal is high (five volts), and since the internal error signal from the internal error detector is high (seven volts), full anti-reset voltage will be applied to the line 150 which controls the reset unit. Specifically, the voltage in the control line 150 will tend to rise from its normal voltage of five volts to a maximum voltage of ten volts which would be the value obtained if reset were not employed. The added voltage, five volts, constitutes the anti-reset signal as indicated at 174 in FIG. 4d. As a result of the anti-reset signal, a voltage of ten volts is applied to the left hand side of the capacitor 103. This is to be compared with the ten volts applied to the right hand side of the capacitor so that the net voltage appearing across the capacitor is zero. In other words, because of the action of the anti-reset circuitry, the reset signal is inhibited. The value of the net reset signal (zero) is indicated at 175 in FIG. 4e. This is to be contrasted with the high value of reset signal 175a which would normally be expected under start-up conditions. As a result of the continued high output of the controller, acting upon the load 80, the condition gradually ascends in the direction of the set point as indicated at 176 in FIG. 4f.

Figure 4F:
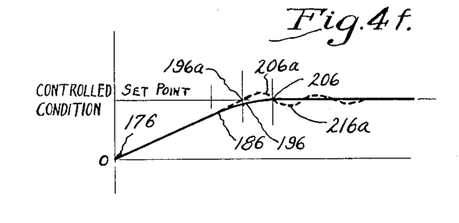

After the edge of the slide wire input error span is reached, as indicated at 186 at FIG. 4f, the slider in the recorded begins to move away from the limit position reducing the amount of the input error signal as indicated at 181 in FIG. 4a. This causes a slight reduction in controller output as indicated at 182 in FIG. 4b. The signal level of the amplifier is less severe as indicated by the detector output 183 in FIG. 4c. The net reset signal continues near the zero reset level even though the reset function is progressively less inhibited because a rate function is assumed, as shown at 185 in FIG. 4e. Some reset action could take place in this region. The reset level would be a function of the reset and rate settings. As the set point is approached more closely, the amount of input error signal is still further reduced as indicated at 191 thereby reducing the controller output to near the fifty percent equilibrium level as indicated at 192. The amplifier is approaching the normal signal level region as indicated at 193. This fact combined with the low value of input error signal reduces the anti-reset signal to near zero as indicated at 194 so that the net amount of reset voltage is indicated at 195. Within a short time thereafter the condition reaches the set point 206 asymptotically and without overshoot. The input error signal is zero as indicated at 201, the controller output is at the fifty percent level 202, the amplifier is at a normal signal level 203, the anti-reset signal is zero at 204, and the reset signal has returned to zero at 205. This completes a step cycle of operation following a large step change.

Attention may, for the sake of comparison, be focused upon the dotted curves which show what would occur in the absence of the present invention. In the first place the net signal resulting from the charge built up across the reset capacitor 103 and indicated by voltage across the capacitor terminals would remain at a high value as indicated at 195a in FIG. 4e until the set point is reached as shown at 196a in FIG. 4f. The reset signal would be so large as to cause full controller output and a large internal error to persist far beyond the time it is required, as indicated at 192a and 183a in FIG. 4b and FIG. 4c respectively. The inevitable effect of maintaining full output is that the set point is exceeded with substantial overshoot as indicated at 206a in FIG. 4f. This causes the reversal in the input error signal as indicated at 201a causing the controller output to decrease as indicated at 202a. The reversal in input error signal instigates a reversal of the reset signal as indicated at 205a with possible undershoot of the controlled condition as shown at 216a. Depending upon the complete system parameters, there may or may not be any undershoot or several additional cycles about the set point until the condition is finally stabilized.

It will be apparent, particularly upon comparison with the above, that the present control system produces optimum performance in the face of large step changes, and this is true regardless of whether the step changes are above or below set point. It is to be particularly noted that the improved operation has been brought about without making any changes in the system which would tend to degrade the performance under "on line" conditions or where small step changes are made in the set point. Moreover, it can be shown that optimum performance is secured for all of the various control conditions regardless of the time constant of the process being controlled and without necessity for making any adjustments other than the normal adjustments which are made in a conventional controller when it is put into operation.

Figure 5:
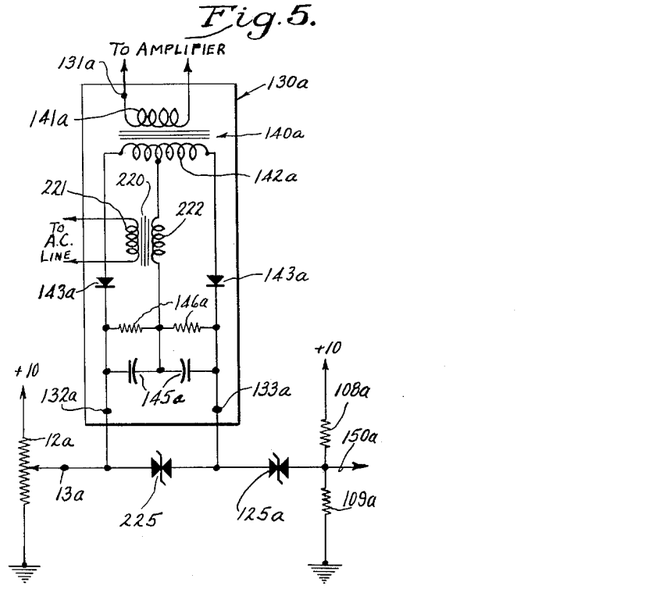
FIG. 5 shows an alternate form of gate usable in the circuit of FIG. 1.

The above description has covered applicants' preferred embodiment in which the gating circuit 110 is formed of a novel arrangement of the diode bridge and zener diode. However, the invention is not limited to the particular bridge circuit but the inventive concept is sufficiently broad as to include equivalent circuits having substantially the same gating characteristics. An example of an equivalent circuit is set forth in FIG. 5. In this figure the portions of the control circuit not shown will be assumed to correspond to that set forth in FIG. 1. Corresponding reference numerals are employed, where applicable, with subscript "a." In carrying out the invention means are provided for producing an internal controller error voltage which varies in polarity as well as in magnitude so that the amplifier signal voltage not only indicates the magnitude of the internal controller error but also whether the internal error signal is in the "condition increase" or "condition decrease" direction. Thus the controller internal error detector 130a has an input terminal 131a and a pair of output terminals 132a, 133a. A transformer 140a is used having a primary 141a and a center tapped secondary winding 142a, with the voltages in the two halves being rectified by diodes 143a. The respective voltages are developed on capacitors 145a and shunted by resistors 146a so that the output voltages are bucked against one another to produce a differential output voltage at the output terminals. In order to make the detector phase sensitive, an auxiliary transformer 220 having a primary winding 221 and a secondary 222 is interposed in the common lead, the primary of the transformer being connected to the A.-C. supply line. Thus under one phase condition of the input voltage the reference voltage is bucked against one half of the winding 142a and added to that of the other half to produce a net D.C. voltage at the output terminals in the one direction. For the opposite polarity condition, the bucking and adding relationships are reversed to reverse the polarity of the output. In carrying out the invention, double-anode zener diode 125a is connected in series with the amplifier signal level voltage. The circuit is completed by connecting one end to the terminal 13a of the slide wire and the other end to the center tap of the voltage divider resistors 108a, 109a. Auxiliary double-anode zener diode 225 connected across the output terminal of the detector limits the internal error voltage to the desired level, i.e., insures that the voltage does not exceed the breakdown voltage of the zener 125a. It will be apparent that by employing the same variation in magnitude of internal error voltage, zero to seven volts, and by using zener diode 125a having the same non-polarity sensitive zener voltage as the diode 125 in the previous embodiment, also seven volts, an anti-reset output voltage will be produced in the reset control line 150a under given conditions of input error signal and internal error signal corresponding to the charted values set forth in FIG. 3. Thus assuming a detector voltage of six volts and a slide wire voltage of eight volts, the net voltage applied to the zener 125a will be eight minus five plus six or nine volts, sufficient to fire the zener. Once conduction takes place the voltage at the output terminal (line 150a) becomes eight plus six minus seven or seven volts, just as indicated in the table, FIG. 2. This calculation can be repeated for the values of input error and internal error to confirm that the anti-reset action of the two circuits is the same.

While the invention has been described above in connection with two preferred embodiments in which an anti-reset signal is generated by auxiliary means for the purpose of inhibiting the reset signal under certain conditions progressively and as a predetermined function of input error and internal error, it will be understood that the invention is not necessarily limited to arrangements in which the anti-reset signal is bucked directly against the reset signal. On the contrary, the invention may be applied to systems in which the input error signal and internal error signal are additively employed to defeat the reset through interposed relays. While it is true that use of relays tends to produce a more abrupt change in the control characteristic so that the alternate arrangement does not have all of the advantages of the embodiments discussed above, nevertheless the modification serves to show the changes which can be made, without departing from the inventive concepts.

Figure 6:
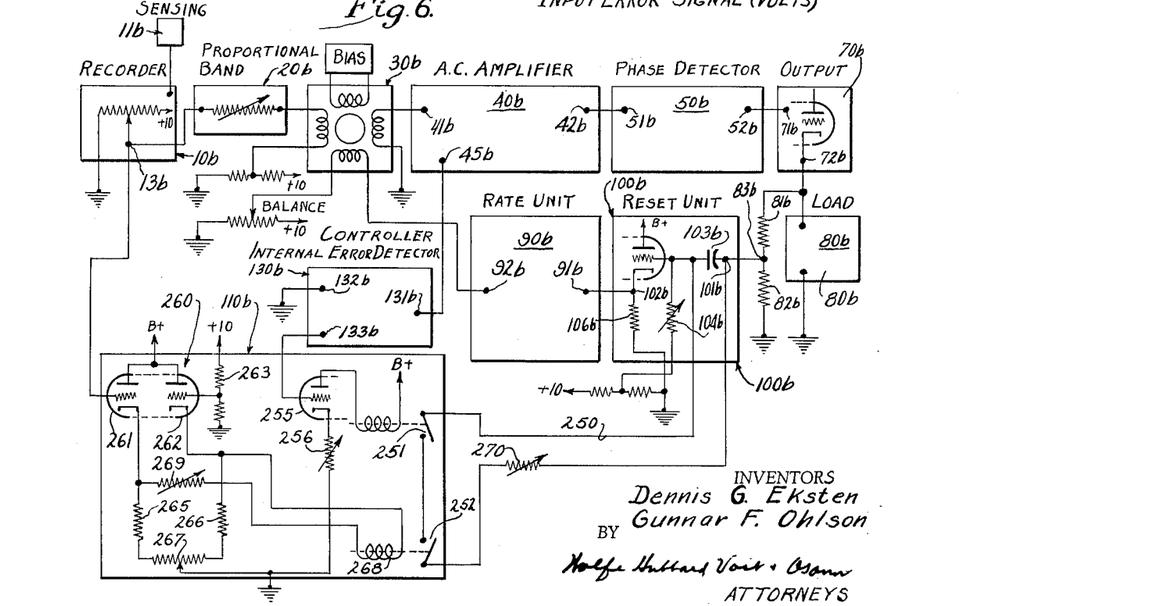
FIG. 6 shows an alternative form of control circuit.

Referring to FIG. 6 it will be noted that it is a simplified block diagram similar to FIG. 1 and employing the same reference numerals, where applicable, with the subscript "b." For the sake of simplicity portions of the circuit, where identical, have not been set forth in detail within the blocks.

Thus, in accordance with a simplified form of the present invention, the regular reset function is defeated under certain conditions of input error and internal error by setting up a shunt circuit 250 about the reset capacitor 103b. This shunt circuit is completed by the contacts of a first relay 251 which is controlled by the internal error signal and the contacts of a second relay 252 which is under the control of the input error voltage. For the purpose of closing the relay 251 when the amplifier signal reaches a predetermined value, a coupling tube 255 is used, with the grid of the tube being connected to the output terminal 133b of the internal error detector. A variable resistor 256 is inserted in the cathode lead for the purpose of adjusting the point at which the relay 251 pulls in.

To operate the error relay 252 at a particular point of input error signal on either side of the reference level of five volts, a coupling assembly 260 is used which includes two triodes 261, 262. These tubes are connected in a balanced arrangement somewhat in the manner of a vacuum tube voltmeter. The grid of the first tube is connected to the output of the recorder while the grid of the second triode is connected to a voltage divider 263 which serves as a five-volt source of reference voltage. In series with the cathodes of the two tubes are cathode resistors 265, 266, the lower ends of which are coupled together by a balancing potentiometer 267. The relay winding, indicated at 268, is shunted across the cathode terminals with a rheostat 269 in series therewith to vary the point of pull-in of the relay 252. It will be apparent that upon departure of the voltage from the reference value sufficiently in one direction or the other, and with the threshold being determined by the adjustment of the rheostat 269, the relay 252 will close. Closure of both of the relays 251, 252 completes the shunting circuit. However, for the purpose of obtaining output limits when the input error span is less than the proportional band span when the anti-reset windup circuit is actuated, a series resistor 270 is used. Where the proportional band is less than the input error span the resistance may be reduced to zero.

It will be apparent that the above circuit in spite of its simplicity possesses a number of advantages over the prior art. Primarily it will be noted that both of the stated conditions must be met before reset is inhibited. Thus simply having a high internal error in the controller in the absence of substantial input error is not adequate to inhibit reset. Nor is a large input error sufficient without a large internal error. Each of these conditions may exist independently, and often do exist independently during normal operation of a control circuit even in the absence of a large step change in the set point. Consequently the circuit of FIG. 6 insures against inhibiting the reset function under normal operating conditions where such inhibition would be undesirable. However, whenever the conditions of large internal error and large input error occur simultaneously, the shunt circuit is closed about the reset capacitor thereby preventing the capacitor from acquiring a substantial charge and so that the net reset signal tends to follow the characteristic shown by the solid line in FIG. 4e rather than that set forth in the dotted line in that figure.

Even when the conditions are met reset is not completely defeated because of the limited reset functions permitted by the series resistor 270. Finally, as the control point is approached and the input error is reduced to a small value, either the relay 251 or the relay 252 will open thereby disconnecting the shunt circuit 250 so that the full reset function is available in the vicinity of the control point. The operation of the relay contacts in the present circuit may be shown to result in less shock to the control system than occurs in prior devices employing relays for somewhat similar purposes. Consequently there is less likelihood of oscillation. Under normal "on line" conditions, with the shunt circuit completely open, both rate and reset correction are fully available for optimum response.

In the following claims the term "zener" is to be interpreted to include equivalent devices having substantially the same input and output characteristics.

We claim as our invention:

1. In an automatic control system for adjusting and maintaining a controlled condition in agreement with a selectable set point value, the combination comprising means for generating an input error signal representative of the error between the controlled condition and the set point value, reset means for producing a reset signal which varies substantially as a time integral function of such error, amplifying means coupled to receive said input error signal and said reset signal for creating an output signal representing the algebraic sum thereof, means coupled to receive said output signal and responsive thereto for correctively restoring the controlled condition to the set point value with proportional and reset action, said amplifying means including means for generating an internal error signal representative of the said algebraic sum, and means coupled to receive at least said internal error signal and responsive thereto for inhibiting said reset means and reducing said reset signal only when the internal error signal exceeds a predetermined value.

2. In an automatic control system for adjusting and maintaining a controlled condition in agreement with a selectable set point value, the combination comprising means for generating an input error signal representative of the error between the controlled condition and the set point value, reset means for producing a reset signal which varies substantially as a time integral function of such error, amplifying means coupled to receive said input error signal and said reset signal for creating an output signal representing the algebraic sum thereof, means coupled to receive said output signal and responsive thereto for correctively restoring the controlled condition to the set point value with proportional and reset action, said amplifying means including means for generating an internal error signal representative of the said algebraic sum, and means coupled to receive both input error signal and said internal error signal and responsive thereto for inhibiting said reset means and reducing said reset signal according to a combined function of such two signals.

3. The combination set forth in claim 2 further characterized by means to prevent action by said inhibiting means unless the said combined function exceeds a predetermined threshold value.

4. The combination set forth in claim 3, further characterized in that said inhibiting means includes means to progressively increase its inhibiting action as said combined function progressively increases above said threshold value.

5. In an automatic control system for adjusting and maintaining a controlled condition in agreement with a selectable set point value, the combination comprising means for generating an input error signal representative of the error between the controlled condition and the set point value, reset means for producing a reset signal which varies substantially as a time integral function of such error, means for algebraically combining said input error signal and said reset signal and amplifying the resultant sum to create an output signal, means coupled to receive and responsive to said output signal for correctively restoring the controlled condition to the set point value with proportional and reset action, said combining and amplifying means including means creating an internal error signal representative of the algebraic sum of said input error signal and said reset signal, means coupled to receive and jointly responsive to said input error signal and said internal error signal for inhibiting said reset means only when conditions of large input error and large internal error simultaneously exist in the system, while leaving said reset means fully effective when the system approaches equilibrium.

6. The combination set forth in claim 5, further characterized in that said inhibiting means include means for preventing operation thereof until the combination of the magnitudes of the input error signal and said internal error signal exceeds a predetermined threshold value.

7. The combination set forth in claim 6, further characterized in that said inhibiting means, when operating, inhibit said reset means to an extent proportional to the amount by which said combination exceeds said threshold value.

8. In an automatic control system having improved response upon making large step changes between the set point and the controlled condition, the combination comprising control means having an input circuit and an output circuit, the input circuit having means for generating an input error signal in response to deviation of the controlled condition from the set point, said output circuit having means for correctively restoring the controlled condition to the set point with proportional action, reset means in said control means for producing integral control action in accordance with a time integral function of the controlled condition, said control means further having means coupled to receive and combine the input error signal with at least a reset signal from said reset means to make the control means operate with proportional plus reset action and including means to produce an integral error signal representative of the algebraic sum of such combined signals, gating means interposed between the input circuit and the reset means for applying to the reset means an anti-reset signal for inhibiting said integral control action progressively with an increase in the input error signal after the input error signal reaches a threshold value, said gating means including means coupled to receive said internal error signal and responsive thereto for varying said threshold value.

9. In an automatic control system having improved response upon making large step changes between the set point and the controlled condition, the combination comprising control means having an input circuit and an output circuit and subject to high signal levels, the input circuit having means for generating an input error signal in response to deviation of the controlled condition from the set point, said output circuit having means for correctively restoring the controlled condition to the set point with proportional action, reset means associated with said control means for producing integral control action in accordance with a time integral function of the controlled condition, said control means further having means coupled to receive and combine the input error signal with at least a reset signal from said reset means to make the control means operate with proportional plus reset action and including means to produce an internal error signal representative of the algebraic sum of such combined signals, gating means connected between the input circuit and the reset means and responsive to the input error signal for controllably inhibiting said reset means, said gating means including means coupled to receive and responsive to said internal error signal for transmitting a controlled fraction of the input error signal to said reset means to inhibit the latter.

10. In an automatic control system having improved response upon making large step changes between the set point and the controlled condition, the combination comprising control means having an amplifier including an input circuit and an output circuit, said input circuit having means for generating an input error signal in response to deviation of the controlled condition from the set point and coupling such signal into said amplifier, said output circuit having means coupled to and controlled by said amplifier for correctively restoring the controlled condition to the set point with proportional action, reset means connected with said control means for producing integral control action, means coupled to receive and responsive to the input error signal for producing an anti-reset signal which varies in accordance with the amount of input error signal, means including an internal error detector for producing a signal which varies in accordance with the amplifier signal level, means including a gate for coupling the anti-reset signal means to the reset means for inhibiting the action of the latter, said gate having control terminals connected to said internal error detector and so arranged that the gate begins to open at substantial levels of amplifier signal and opens fully when a predetermined high level of amplifier signal is reached.

11. In an automatic control system having improved response upon making large step changes between the set point and the controlled condition, the combination comprising control means having an input circuit and an output circuit and subject to high internal signal levels, the input circuit having means for generating an input error signal in response to deviation of the controlled condition from the set point, said output circuit having means for correctively restoring the controlled condition to the set point with proportional action, reset means in said control means for producing integral control action, said control means further having means for coupling said input circuit to said output circuit with an internal error signal existing in such coupling means, gating means connected between the input circuit and the reset means for applying to the reset means an anti-reset signal for inhibiting said reset means, and gate operating means so arranged that the gate is progressively opened to vary the amount of the anti-reset signal applied to said reset means in accordance with the magnitude of said internal error signal in the control means.

12. In an automatic control system having improved response upon making large step changes between the set point and the controlled condition, the combination comprising control means having an input circuit and an output circuit and subject to high internal signal levels, the input circuit having means for generating an input error signal in response to deviation of the controlled condition from the set point, said output circuit having means for correctively restoring the controlled condition to the set point with proportional action and having means providing reset action, said control means including means for coupling said input circuit to said output circuit and having an internal error signal existing therein, and gating means for applying to the reset means anti-reset signal for inhibiting said reset means, said gating means having first and second input terminals and an output terminal, said output terminal being connected to the reset means and said input terminals being connected for response to the input error signal and to the internal error signal respectively for applying the anti-reset signal to the reset means upon coexistence of a high input error signal and a high internal error signal.

13. In an automatic control system having improved response upon making large step changes between the set point and the controlled condition, the combination comprising control means having an input circuit and an output circuit, said input circuit having means for generating an input error signal in response to deviation of the controlled condition from the set point, said output circuit having means for correctively restoring the controlled condition to the set point with proportional action, an amplifier coupling said input circuit to said output circuit and carrying an internal error signal, said control means including reset means coupled to the input of said amplifier for producing integral control action, a bridge circuit having an input terminal together with an output terminal and a pair of diagonal terminals and having diodes in the four legs thereof, the input terminal being connected for response to the input error signal and the output terminal being coupled to said reset means, high impedance means for producing a reference voltage at said bridge output terminal, means including an internal error detector coupled to receive said internal error signal for producing a direct voltage signal in accordance with the magnitude of such internal error signal, means including a zener diode for applying such direct voltage to the diagonal terminals of the bridge so that the voltage at the output of the bridge varies in accordance with changes in the voltage at the input terminal under conditions of large internal error signal but remains constant at the reference value during conditions of small internal error signal.

14. In an automatic control system having improved response upon making large step changes between the set point and the controlled condition, the combination comprising control means having an input circuit as well as an amplifier and an output circuit, said input circuit having means for generating an error signal which varies increasingly and decreasingly from a reference value in response to deviation of the controlled condition above or below the set point, said output circuit having means for correctively restoring the controlled condition to the set point with proportional action, reset means in said system for producing integral control action and having a control terminal for receiving an anti-reset voltage for inhibiting the integral action, an anti-reset circuit having an input terminal and an output terminal, a high impedance source of reference voltage corresponding in magnitude to said reference value, the input terminal of the anti-reset circuit being connected for response to the input error signal and the output terminal being coupled to the control terminal of said reset means and to said source of reference voltage, said anti-reset circuit including means for producing a direct voltage internal error signal in accordance with the amplifier signal level of the control means together with a zener diode in series therewith so that the voltage applied to the control terminal remains at said reference value to produce normal operation of the reset means in the vicinity of the set point but departs therefrom for inhibiting integral action for high values of input error signal and internal error signal.

15. In an automatic control system having improved response upon making large step changes between the set point and the controlled condition, the combination comprising control means having an input circuit, an amplifier, an output circuit, and a negative feedback circuit, said input circuit connected to make the effective net input signal to said amplifier, and the internal error signal therein, dependent upon the combination of an input signal and a feedback signal derived from said output circuit, having means for generating an input error signal in response to deviation of the controlled condition from the set point, said output circuit having means for correctively restoring the controlled condition to the set point with proportional action, reset means in said feedback circuit for producing integral control action, said reset means comprising a series capacitor, and means coupled to receive and responsive to the input error signal and to said internal error signal in the amplifier for inhibiting the building up of charge on said capacitor as long as the input error and internal error both exist at a high level.

16. In an automatic controller having improved response upon making large step changes between the set point and the controlled condition, the combination comprising control means having an input circuit, an amplifier, an output circuit, and a negative feedback circuit, said input circuit having means for generating and coupling into said amplifier an input error signal in response to deviation of the controlled condition from the set point, said output circuit having means coupled to the output of said amplifier for producing a final output signal and for correctively restoring the controlled condition to the set point with proportional action, said feedback circuit including means for coupling a feedback signal from said output circuit to the input of said amplifier so that an internal error signal in the amplifier depends upon the combination of the input error signal and the feedback signal, reset means in said feedback circuit for producing integral control action, said reset means comprising a series capacitor, means for applying to one side of said capacitor a voltage proportional to said final output signal, and means coupled to receive and jointly responsive to said input error signal and said internal error signal for applying to the other side of said capacitor an anti-reset voltage for inhibiting the building up of charge on said capacitor as long as input error and internal error both exist at a high level.

17. In an automatic controller having improved response upon making large step changes between the set point and the controlled condition, the combination comprising control means having an input circuit, an amplifier, an output circuit, and a negative feedback circuit, said input circuit having means for generating and applying into said amplifier an input error signal in response to deviation of the controlled condition from the set point, said output circuit having means connected to receive and responsive to the output of said amplifier for producing a final output signal and for correctively restoring the controlled condition to the set point with proportional action, said feedback circuit including means for coupling a feedback signal from said output circuit into the input of said amplifier so that an internal error signal therein varies as the algebraic sum of the input error signal and the feedback signal, reset means in said feedback circuit for producing integral control action, said reset means comprising a series capacitor having input and output sides, means for connecting the input side of said capacitor to the output circuit so that the variations in the final output signal increasingly and decreasingly from an equilibrium condition produce variations in the voltage across said capacitor increasingly and decreasingly from a reference value, means for applying a second reference voltage to the output side of said capacitor, and means coupled to receive and responsive to said input error signal and said internal error signal for causing the voltage at the output side of the capacitor to be varied from the second reference value in the same direction as the voltage variations at the input side of the capacitor thereby to avoid buildup of charge on said capacitor for inhibiting of its integral control action, and means for preventing said last-named means from operating until the combination of magnitudes of said input error signal and said internal error signal exceeds a predetermined threshold value.

18. In an automatic controller having improved response upon making large step changes between the set point and the controlled condition, the combination comprising control means having an input circuit, a amplifier, an output circuit connected in tandem relation, and a negative feedback circuit connected from the output circuit to the input of said amplifier so that the internal error signal in the amplifier varies as the algebraic combination of the signals received from the input circuit and the feedback circuit, said input circuit having means for generating an input error signal in response to deviation of the controlled condition from the set point, and said output circuit having means for producing a final output voltage and for correctively restoring the controlled condition to the set point with proportional action, reset means in said feedback circuit for producing integral control action, said reset means comprising a series capacitor having an input side and an output side, a first voltage divider having its input connected to receive said final output voltage and its output connected to the input side of said capacitor so that a voltage is applied to said capacitor which is at a reference value when the controller is in equilibrium but which varies increasingly and decreasingly from the reference value when the load is increased or decreased, means including a second voltage divider for applying to the output side of the capacitor a reference voltage at said reference value, and means connected to the output side of the capacitor for causing the voltage at said output side to depart from the reference value when said input error signal and said internal error signal are both at a high level progressively from a threshold value and in an amount which depends upon the level thereof.

References Cited by the Examiner
UNITED STATES PATENTS 2,788,441   4/1957   Zimmerli __________ 328—132
2,830,245   4/1958   Davis et al. __________ 236—78

JOHN W. HUCKERT, *Primary Examiner.*

ROY LAKE, ARTHUR GAUSS, *Examiners.*